(12) United States Patent
Hoshiko

(10) Patent No.: US 6,985,495 B2
(45) Date of Patent: Jan. 10, 2006

(54) PACKET COMMUNICATION MONITOR

(75) Inventor: Takeshi Hoshiko, 4-20-18,
Higashi-choo, Koganei-shi, Tokyo (JP)

(73) Assignee: Takeshi Hoshiko, Koganei (JP)

( * ) Notice: Subject to any disclaimer, the term of this patent is extended or adjusted under 35 U.S.C. 154(b) by 1150 days.

(21) Appl. No.: 09/858,453

(22) Filed: May 17, 2001

(65) Prior Publication Data

US 2001/0046222 A1    Nov. 29, 2001

(30) Foreign Application Priority Data

May 27, 2000    (JP) .............................. 2000/197337

(51) Int. Cl.
*H04J 1/16*       (2006.01)
*H04Q 7/34*       (2006.01)
*G06F 11/00*      (2006.01)

(52) U.S. Cl. .......................... 370/470; 702/67; 714/39; 714/57

(58) Field of Classification Search ............. 370/230.1, 370/252, 332, 333, 336, 345, 437, 470, 474, 370/498; 345/440.1; 375/240.27; 341/94; 702/67; 714/39, 48, 57
See application file for complete search history.

(56) References Cited

U.S. PATENT DOCUMENTS

| | | | | |
|---|---|---|---|---|
| 4,890,332 A | * | 12/1989 | Takahashi | ................. 455/67.13 |
| 5,138,616 A | * | 8/1992 | Wagner et al. | ............... 714/704 |
| 5,377,204 A | * | 12/1994 | Takahashi | .................... 345/558 |
| 5,638,384 A | * | 6/1997 | Hayashi et al. | ............. 714/752 |
| 5,664,105 A | * | 9/1997 | Keisling et al. | ............. 709/224 |
| 5,794,124 A | * | 8/1998 | Ito et al. | ..................... 340/7.44 |
| 6,912,247 B2 | * | 6/2005 | Miyashita et al. | .......... 375/228 |

\* cited by examiner

*Primary Examiner*—John Pezzlo
*Assistant Examiner*—Ahmed Elallam

(57) ABSTRACT

A packet communication monitor used for radio packet communication system having computer with display, comprises means for detecting and storing electric field strength data while receiving frame with time series, means for detecting and storing data of a start time and an end time of the receiving said frame, and means for checking and storing correct/error status data of said frame in time series. On the bases of these stored data, said packet communication monitor is able to display waveform of the electric field strength, and the length and the status of correct/error of said frame graphically and simultaneously.

1 Claim, 9 Drawing Sheets

FIG. 3

| START FLAG | ADDRESS | CONTROL | PID | INFORMATION | FCS | END FLAG |
|---|---|---|---|---|---|---|
| 8 bits | 112/560bits | 8 bits | 8 bits | 8*N bits | 16 bits | 8 bits |

| COUNT VALUE | ELECTRIC FIELD STRENGTH |
|---|---|
| C1(1) | S(1) |
| C1(2) | S(2) |
| ... | ... |
| C1(n) | S(n) |
| C1(n+1) | S(n+1) |

5B

| START COUNT VALUE | END COUNT VALUE |
|---|---|
| C2(1) | C3(1) |
| C2(2) | C3(2) |
| ... | ... |
| C2(r) | C3(r) |
| C2(r+1) | C3(r+1) |

5C

| ARRAIVAL SEQUENCE NUMBER | CORRECT / ERROR |
|---|---|
| 1 | N(1) |
| 2 | N(2) |
| ... | ... |
| r | N(r) |
| r+1 | N(r+1) |

PACKET COMMUNICATION MONITOR

FIELD OF THE INVENTION

The present invention relates a packet communication monitor used for a packet radio communication system.

BACKGROUND OF THE INVENTION

There is a continuing progress of technology of the packet radio communication. The packet radio communication has many advantages over other communication system. On the other hand, there are some problems that are attributed to the characteristic of a radio communication. One of the problems is fading.

Fading is the phenomenon of a fluctuation in intensity of received radio waves while the adjustments of sending and receiving apparatus remain unchanged. In the presence of fading, packet error easily arises during packet radio communicating. It is well known that there is relationship between the ratio of packet length to period of fluctuation of fading and a packet error rate. In particular, packet error easily arises, as the packet length is longer to the period of the fluctuation.

Therefore, it is important to investigate the relationship between the ratio of packet length to the period of fluctuation of fading and an error occurrence state of packet. It is possible to investigate the state of fading period, for example, by using electric field intensity measuring set. It is also possible to investigate error status of packet, for example, by using line monitor. However, there is not the method, which is capable of graphically and simultaneously indicating the fading period and an error occurrence state of packet.

SUMMARY OF THE INVENTION

It is an object of the invention to provide the packet communication monitor capable of solving the vagueness of the recognition of the relationship between fading and an error occurrence state of the packet. The packet communication monitor is able to display the electric field strength waveform of received frames signals, and the lengths and correct/error state of frames on a display at the same time. The said frames involve packet frames and the other frames.

Concretely, while a receiver is receiving the frames, electric field strength is detected in digital form with time series. Then data of the electric field strength are stored in memory. On the other hand, the start time and the end time of receiving each frame and correct/error state of said frames are detected and stored in memory. On the bases of those in the memory, the electric field strength is displayed on XY-axes as waveform. And, the lengths of the frames are displayed on the XY-axes as line segments that indicate the interval of the start time and the end time of each received frame. Furthermore, to distinguish correct frame from error frame, for example, each line segment is colored according to whether correct frame or error frame. (The X-axis is time and the Y-axis is the electric field strength.)

As above-mentioned, the time length and correct/error status of each frame and the waveform of received electric field strength are graphically and simultaneously displayed on the XY-axes. Accordingly, the packet communication monitor makes it easy to investigate the relationship between the fading and an error occurrence state of packet.

BRIEF EXPLANATION OF THE DRAWING

The foregoing and other advantages of the invention will be more fully understood with reference to the description of the best mode and the drawing wherein:

FIG. 3 shows a typical frame used for the packet radio communication system of the present invention;

FIG. 5 shows monitor data tables stored in storage of a computer;

DESCRIPTION OF THE BEST MODE FOR CARRING OUT THE INVENTION

Figure 1:
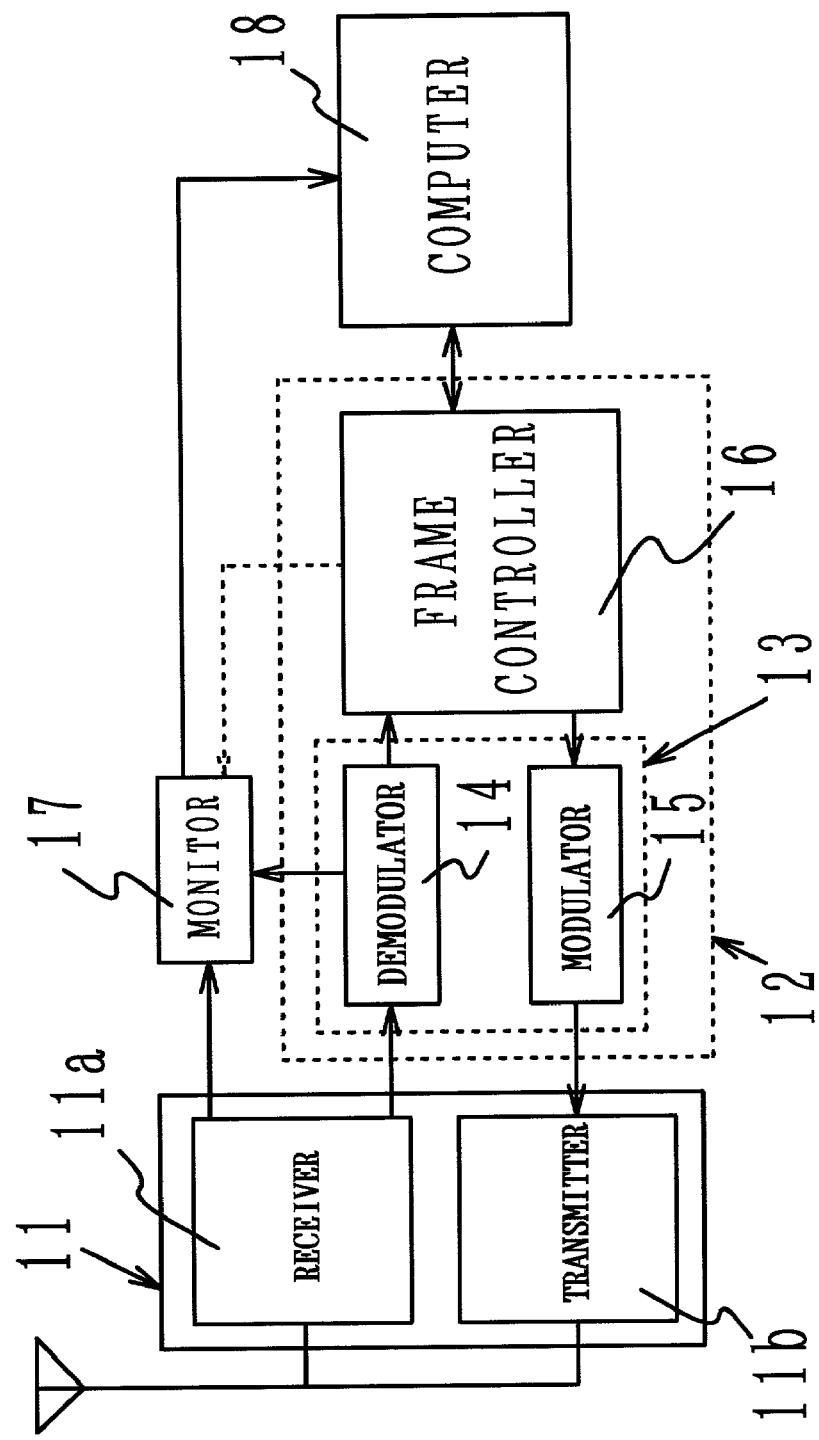
FIG. 1 is a basic block diagram of the packet radio communication system comprising a monitor of the present invention.

FIG. 1 shows a basic block diagram of the packet radio communication system comprising the monitor of the present invention.

The said packet radio communication system comprises a radio portion 11, a Terminal Node Controller (referred as TNC below) 12, a monitor 17 and a computer 18 provided a display. A protocol used for said packet radio communication system is, for example, the frame synchronous method such as HDLC. And the communication speeds of sending/receiving side are in agreement.

The radio portion 11 comprises a receiver 11a and a transmitter 11b. The TNC 12 comprises a modem 13 and a frame controller 16. The modem 13 comprises a demodulator 14 and a modulator 15. The frame controller 16 comprises means for assembling and disassembling a packet frame such as Packet Assembler Disassembler (PAD), means for checking whether or not errors exist in frame in the order of the arrival of frame, and means for controlling frame. It assembles information data transmitted from the computer 18 into frames and sends these frames through the modulator 15 into the transmitter 11b. Further, it checks and disassembles the frames that are transmitted through the demodulator 14 from the receiver 11a into information data and sends these information data into the computer 18.

Figure 2A:
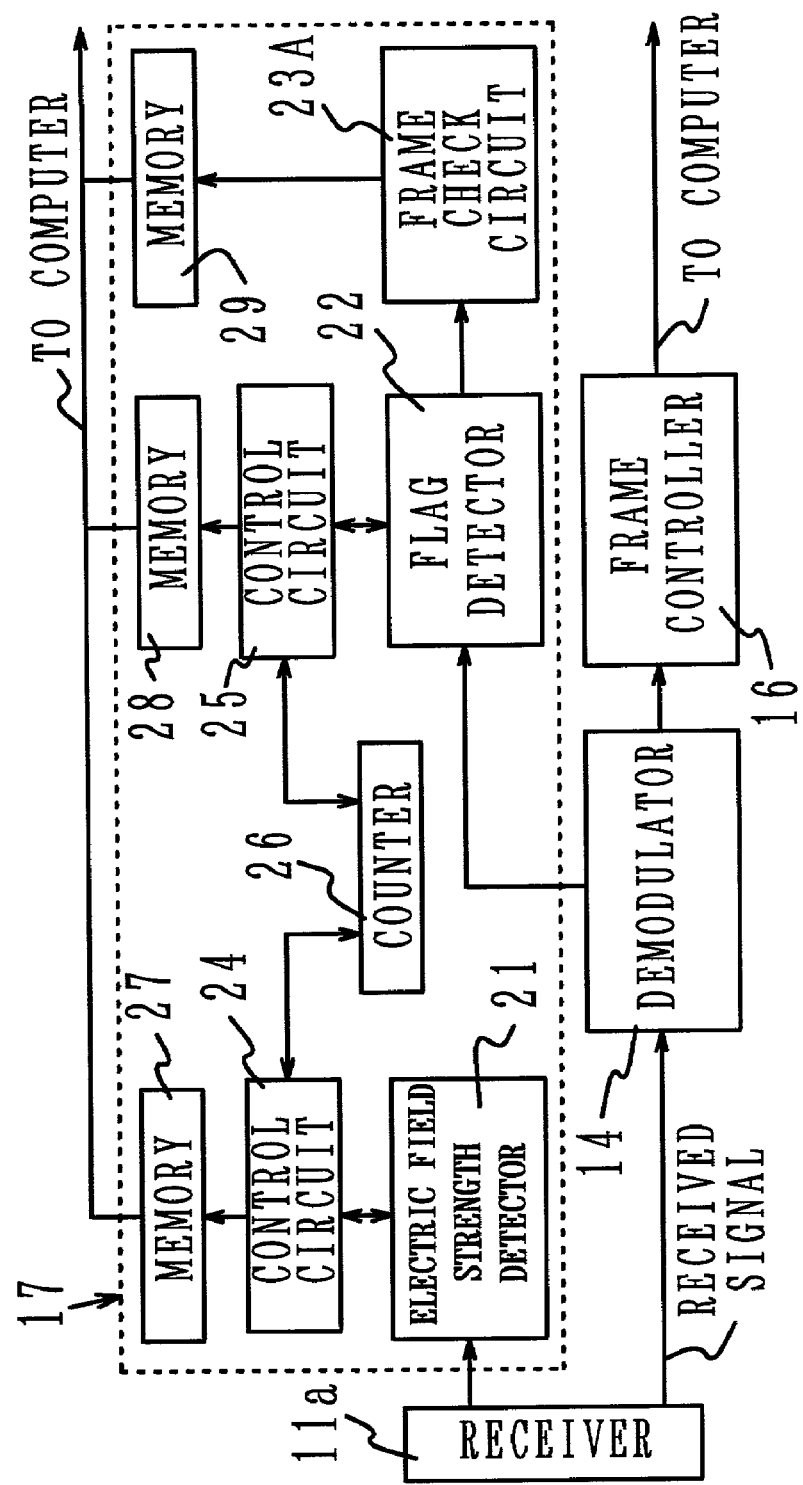
FIG. 2A shows the monitor of the present invention.

FIG. 2A shows an embodiment of the monitor of the present invention. Referring to FIG. 2A, the monitor 17 comprises an electric field strength detector 21, a flag detector 22, a frame check circuit 23A, control circuit 24, 25, a counter 26 and memory 27,28,29.

The electric field strength detector 21 measures and detects electric field strength S(n) while the receiver 11a of receiving side is receiving the signals of the frames transmitted from the transmitter 11b of sending side. The electric field strength S(n) is detected as digital data at a predetermined interval time. The flag detector 22 receives the signals of the frames demodulated in digital form by the demodulator 14 while taking frame synchronization and then detects a start flag and an end flag of each frame.

The control circuit 24 detects count value C1 (n) of the counter 26 when the electric field strength detector 21 detects the electric field strength S(n). The memory 27 stores the count value C1 (n) and the electric field strength S(n). The control circuit 25 detects count value C2(r) and C3(r). The said C2(r) is the count value of the counter 26 when the flag detector 22 detects the start flag, and said C3(r) is the count value of the counter 26 when the flag detector 22 detects the end flag, respectively. Accordingly, the count value C2(r) and C3(r) correspond to the start time and the end time of the receiving frame, respectively. The memory 28 stores the count value C2(r) and C3(r). The said counter 26 is a time counter which increases count value constantly at regular intervals of time, accordingly it functions like a real-time clock.

The said frame check circuit 23A comprises means to check whether or not errors exist in frame in the order of the arrival of frame and means to provide arrival sequence number r of said frame. The said arrival sequence number r is sequentially increased in the order of the arrival of frames at the receiver 11a. The memory 29 stores the correct/error data N(r) of the frames in cross-reference with the arrival sequence number r of each frame.

Figure 2B:
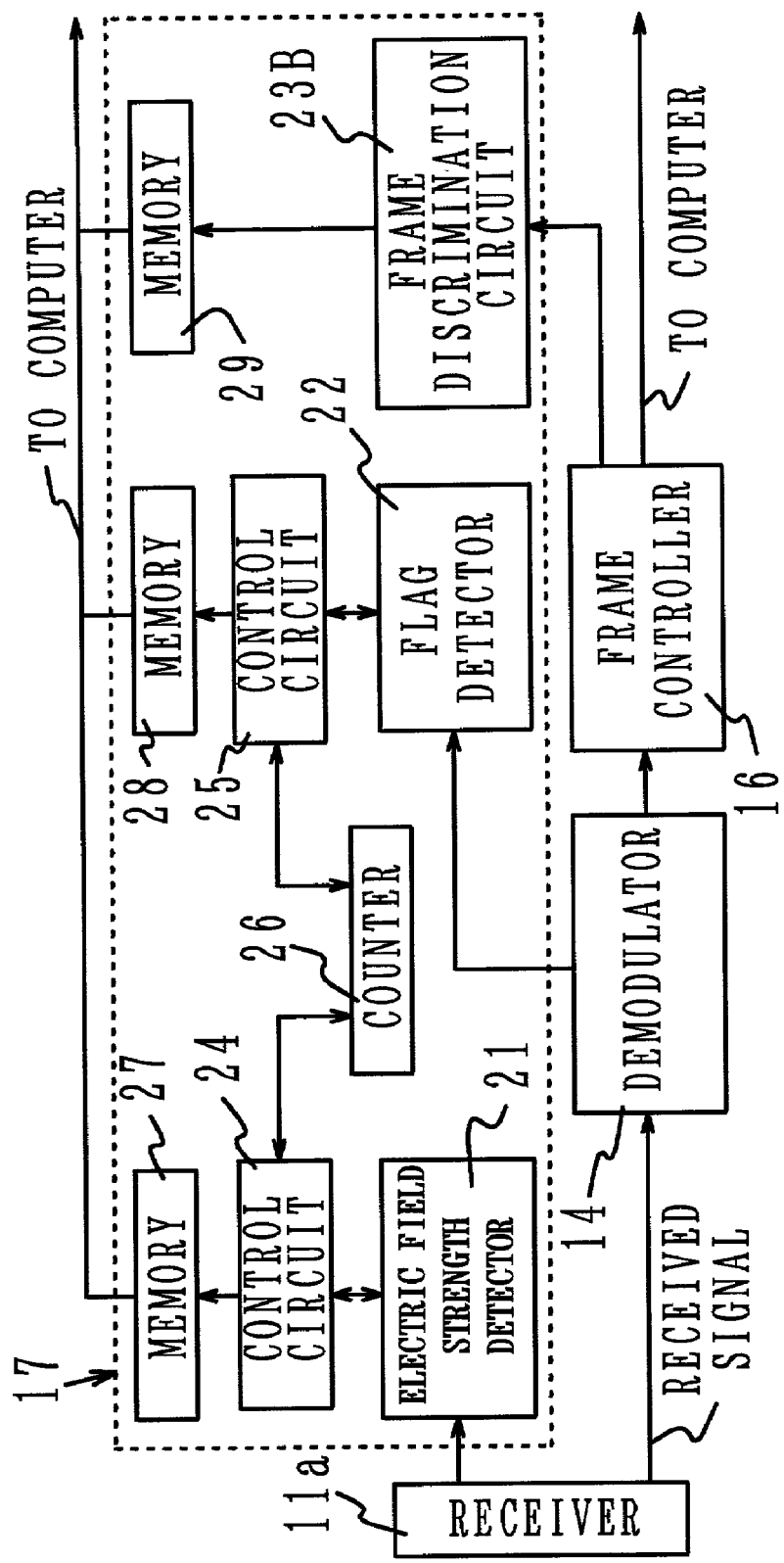
FIG. 2B shows another embodiment of the monitor of the present invention.

FIG. 2B shows another embodiment of the monitor 17. The monitor 17 in FIG. 2B comprises the frame discrimination circuit 23B instead of the frame check circuit 23A. The frame discrimination circuit 23B reads results of correct/error status of frames from the frame controller 16 which checks whether or not errors exist in each frame in the arrival order of the frames. On the bases of the results, the arrival sequence number r and the correct/error data N(r) are entered into the memory 29 by the frame discrimination circuit 23B.

The monitor 17 in FIG. 2B is identical with that in FIG. 2A except that the monitor 17 takes the correct/error data of frame from the frame controller 16.

FIG. 3 shows I frame that is one of typical frame used for the packet radio communication system of the present invention.

I frame (packet frame) consists of fields which are ①Start(Beginning) Flag, ②Address, ③Control, ④PID(Protocol Identifier), ⑤Information, ⑥FCS, ⑦End Flag. As for the packet communication, information field is used to convey the packet data. Generally, the term packet implies the information field. The length of the information field is variable according to the length of packet data stream. Therefore, the longer of the length of the information field the longer packet frame length becomes. As for other frames, there are Supervisory frame (S frame) and Unnumbered frame (U frame), which do not have the information field.

In this description, the term frame implies I frame (packet frame), S frame, U frame and the others.

The manner of operation of the various units described in connection with the drawings will be explained particularly.

Firstly, the information data entered in the computer 18 are transferred into the frame controller 16 of the TNC 12 of sending side.

Then said information data are assembled to become packet frames by the frame controller 16. The said packet frames are modulated by the modulator 15 and then transmitted by the transmitter 11b of the sending side. The frames transmitted by the transmitter 11b involve packet frame (I frame), S frame, U frame and the others.

Figure 4B:
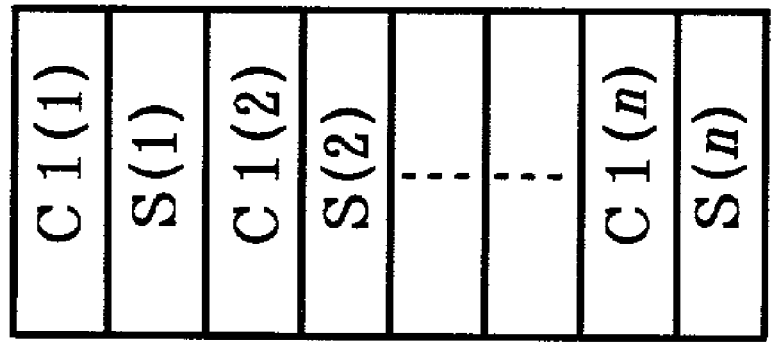
FIGS. 4A–4B shows monitor data stored in memory.
Figure 4A:
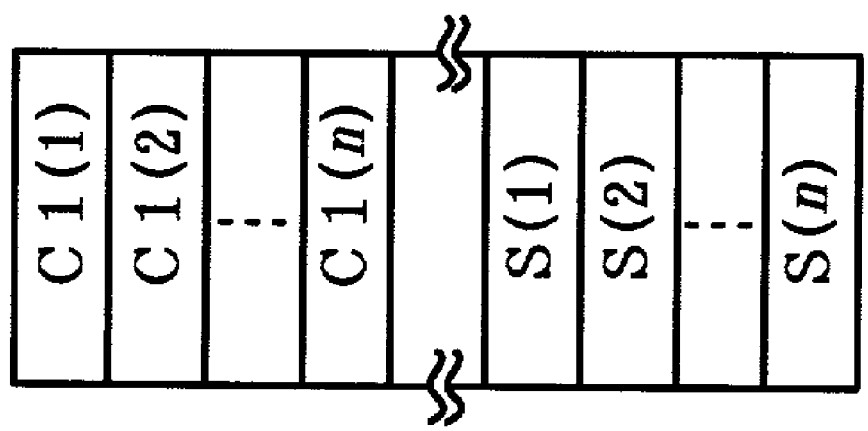

The receiver 11a of receiving side receives signals of the frames that are transmitted by the transmitter 11b of the sending side. Then electric field strength S(n) of said signals is measured sequentially and constantly with a predetermined sampling interval by the electric field strength detector 21. The said electric field strength S(n) is detected in digital form with, for example, A/D converter. The control circuit 24 detects count value C1(n) of the counter 26 when the electric field strength S(n) is detected by the electric field strength detector 21. The count value C1 (n) and the electric field strength S(n) are stored in the memory 27 with time series as shown in FIG. 4A or 4B.

The said signals of the frames are demodulated by the demodulator 14. Then, these frames are sequentially and constantly fed to the flag detector 22. The flag detector 22 detects sequentially a start flag and an end flag of each frame. Then the control circuit 25 detects count value C2(r) and C3(r) of the counter 26 when the flag detector 22 detects the start flag and the end flag of each frame, respectively. The count value C2(r) and C3(r) are stored in the memory 28. The said signals of the frames demodulated by the demodulator 14 are transmitted through the flag detector 22 into the frame check circuit 23A. Then the frame check circuit 23A checks sequentially whether each frame is correct frame or error frame.

On the bases of the check results of the frames, the memory 29 stores the correct/error data N(r) of each frame in the arrival order of the frame in cross-reference with the arrival sequence number r. The said N(r) is indicated, for example, "0" or "1", according as correct frame or error frame.

In another embodiment of the monitor 17 of the invention, the frame discrimination circuit 23B can be used instead of the frame check circuit 23A. Namely, the frame discrimination circuit 23B can take the check results of the frames from the frame controller 16, because the frame controller 16 checks whether the frame is correct frame or error frame in the order of the arrival of frame.

As mentioned above, monitor data which are the electric field strength S(n) and the count value C1(n), the count value C2(r) and C3(r), and the arrival sequence number r and the correct/error data N(r) are stored in the memory 27,28,29, respectively.

At a point of time when specific amounts of the monitor data are accumulated, the monitor data are transmitted from the memory 27,28,29 to the storage of the computer 18. The said monitor data are stored in the table 5A–5C as shown in FIG. 5. In other words, each record of the table 5A consists of the count value C1 (n) and the electric field strength S(n), each record of the table 5B consists of the count value C2(r) and C3(r), and each record of the table 5C consists of the arrival sequence number r and the correct/error data N(r), respectively. On the bases of these monitor data, the lengths and correct/error state of the frames and the waveform of the electric field strength are simultaneously displayed on the display by the software which is stored in the computer 18.

The steps of displaying them are explained in the following.

Figure 6:
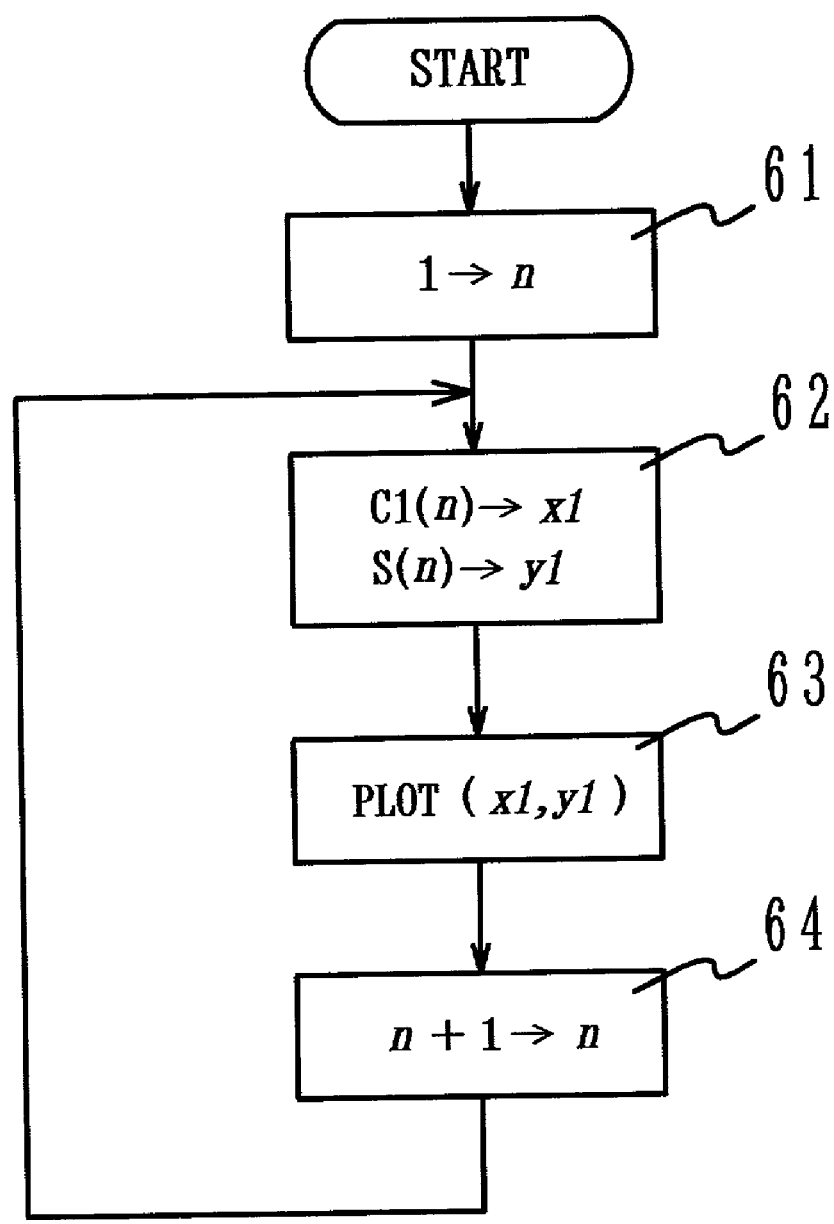
FIG. 6 is a flow diagram for displaying waveform of electric field strength.
Figure 8:
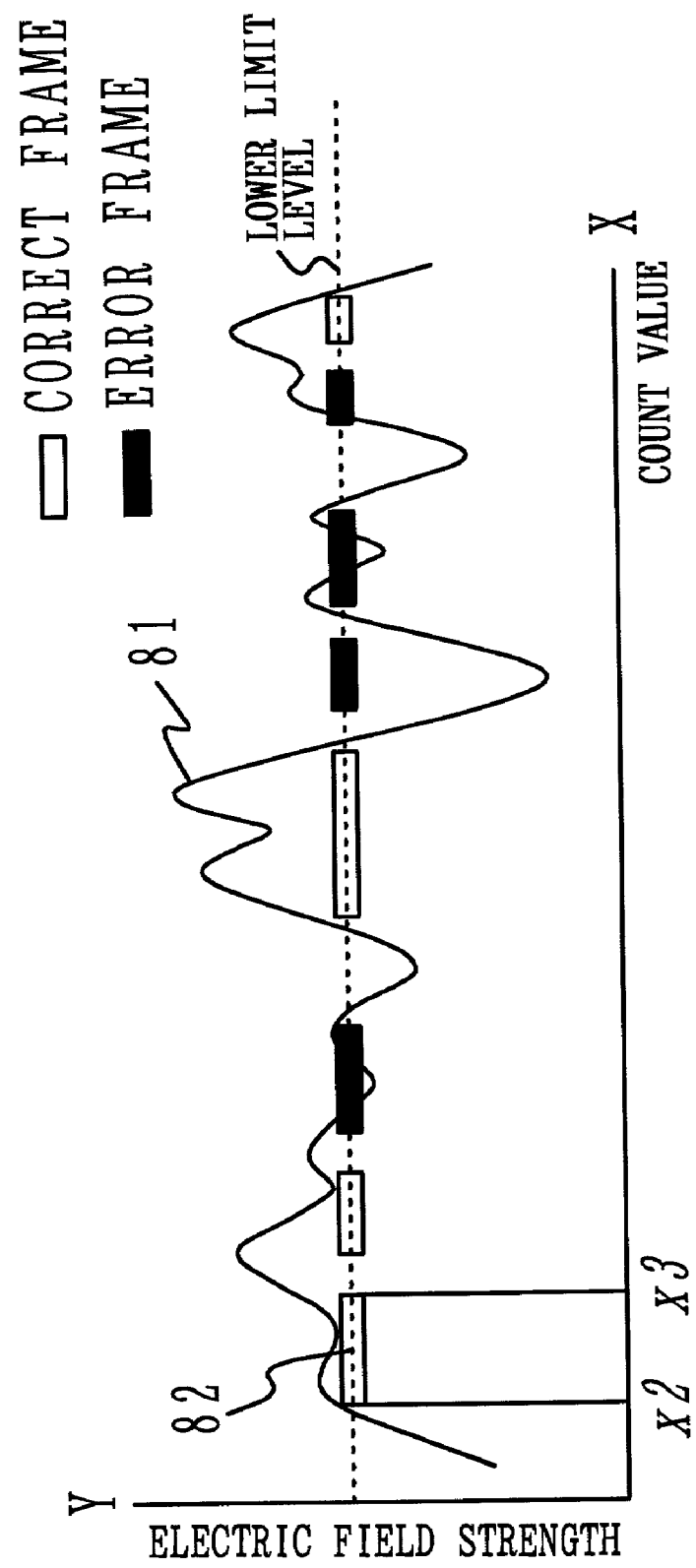
FIG. 8 shows the waveform of the electric field strength and the lengths and correct/error state of the frames, which are graphically displayed.

The electric field strength S(n) is indicated on the display as waveform 81 by the software as shown FIG. 8. More particularly, referring to FIG. 6, one is substituted to n in order to read the first data in step 61. Then count value C1 (1) and electric field strength S(1) are read from the storage and substituted to the respective variable x1 and y1 in step 62. In step 63, point (x1,y1) is plotted on the XY-axes which represents count value on its X-axis (lateral axis) and electric field strength on its Y-axis (longitudinal axis) on the display. Then the n is increased by one in step 64, and the next data is read from the storage in step 62.

As above-mentioned, electric field strength waveform is displayed on the XY-axes.

Figure 7:
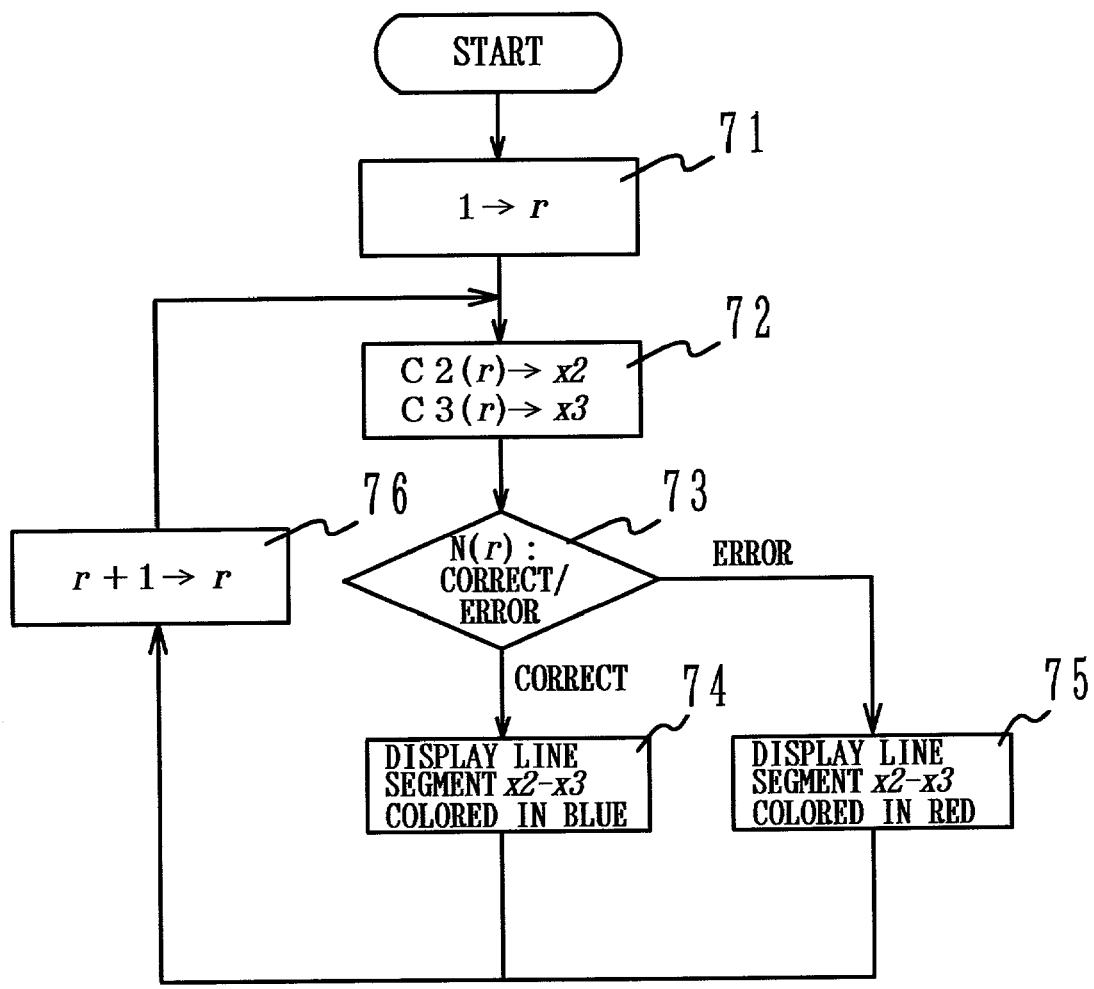
FIG. 7 is a flow diagram for displaying lengths and correct/error state of frames on a display.

Now referring to FIG. 7, the steps of displaying length and correct/error status of the frame by the software are explained in the following.

In step 71, one is substituted to r in order to read the data of the first frame.

In step 72, counter value C2(1) and C3(1) are read from the storage and then substituted to the respective variable x2 and x3 which represent X-coordinate.

Then, N(1) is judged whether correct or error in step 73. In case that N(1) is correct, line segment (x2-x3) 82 is displayed in blue on the XY-axes in step 74. In case that N(1) is error, line segment (x2-x3) 82 is displayed in red on the XY-axes in step 75. (Y-coordinate of line segment (x2-x3) 82 is a desired coordinate.)

As mentioned above, the first frame is displayed on the XY-axes as the line segment (x2-x3) 82 as shown FIG. 8.

Then the r is increased by one in step 76 and the next data is read from the storage in step 72.

The second, the third,-----, the r-th frame shall be displayed as mentioned in the above.

By the way, If a time lag exists between the time when the electric field strength of signal of the flag (start flag or end flag of frame) is detected by the electric field strength detector 21 and the time when said flag is detected by the flag detector 22; the count value C1 (n) or the count value C2(r), C3(r) should be corrected. The method for correcting the count value is such as following. For example, in case that the detection of the flag is delayed more than the detection of the electric field strength of signal of said flag; the count value corresponding to the time lag should be added to the count value C1(n), or subtracted from the count value C2(r) and C3(r). The said time lag is equal to a delay time to the detection of the flag from the detection of the electric field strength of signal of said flag. The time lag can be obtained by theoretic calculation or by experiment.

Consequently, the waveform of the electric field strength and the line segment of the frame are displayed on the X-axis (time-axis) without generating deviation.

As above-mentioned, the time length and the correct/error status of each frame and the waveform of the received electric field strength are graphically and simultaneously displayed so that it is able to easily compare the period of fluctuation of electric field strength with the frame length and to recognize lower limit level of electric field strength for communicating.

What is claimed is:

1. A packet communication monitor used for a radio packet communication system having a computer with a display, comprising;
   means for detecting electric field strength while receiving frames and storing data of said electric field strength with time series,
   means for detecting and storing data of a start time and an end time of receiving each frame,
   means for checking correct/error status of said frames and storing data of said correct/error status sequentially,
   means for graphically and simultaneously displaying waveform of said electric field strength, and the length and the correct/error status of said frames on the display, on the bases of said data.

* * * * *